(No Model.)
J. JOHNSON.
COUPLING FOR PLOWS.
No. 507,909. Patented Oct. 31, 1893.
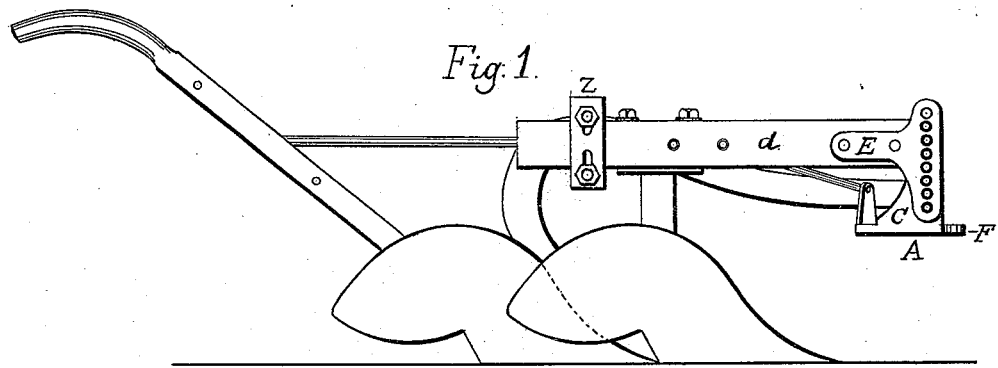
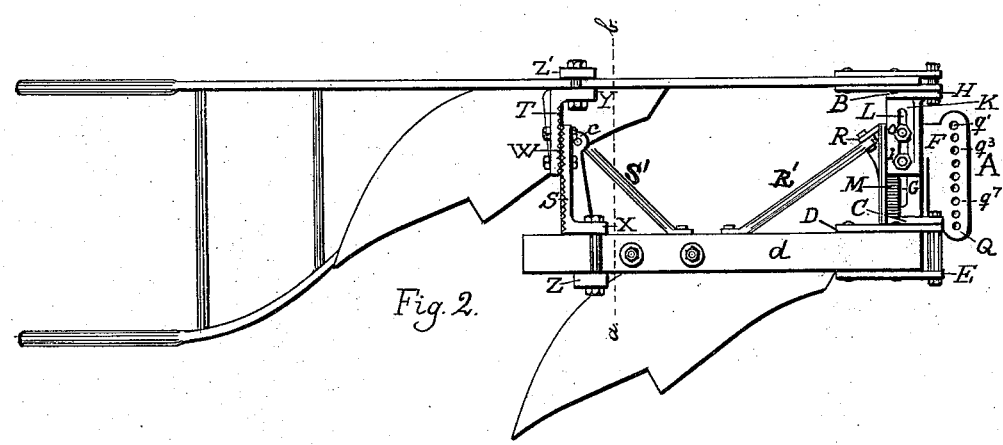
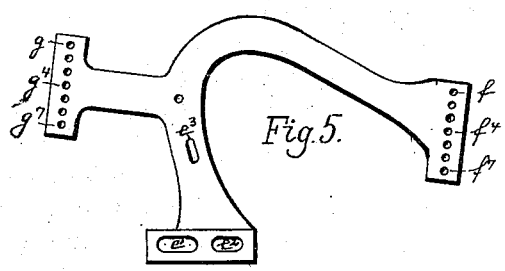
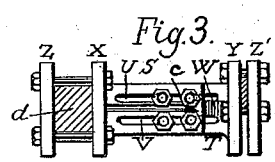
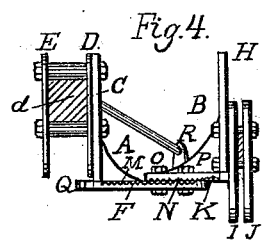
WITNESSES:
INVENTOR
John Johnson

UNITED STATES PATENT OFFICE.

JOHN JOHNSON, OF OMAHA, NEBRASKA.

COUPLING FOR PLOWS.

SPECIFICATION forming part of Letters Patent No. 507,909, dated October 31, 1893.

Application filed March 16, 1892. Renewed October 6, 1893. Serial No. 487,390. (No model.)

*To all whom it may concern:*

Be it known that I, JOHN JOHNSON, a citizen of the United States, residing at the city of Omaha, in the county of Douglas and State of Nebraska, have invented a new and useful Device for the Coupling of Walking-Plows, of which the following is a specification.

The objects of my improvement are, first, the coupling in its reality; second, to afford facility for the proper adjustment of these couplings in regard to the respective plows. I attain these objects by the mechanism illustrated in the accompanying drawings, in which—

Figure 1 is a side view of two walking plows provided with the couplings. Fig. 2, represents a top view of Fig. 1. Fig. 3, is a horizontal front view of the rear coupling after the line $a-b$ of Fig. 2. Fig. 4, is a horizontal front view of the front coupling, and Fig. 5, represents a side view of a substitute for the beam in a steel plow constructed according to the purpose.

Similar letters refer to similar parts throughout the several views.

The front coupling consists of two main pieces or plates A and B. The two sides of plate A make a right angle with each other. The perpendicular side C is provided with holes, which correspond with the holes in the clevis-holders D and E. The horizontal side F of plate A is provided with a slot G. The two sides of plate B make also a right angle with each other. The perpendicular side H is provided with holes which correspond with the holes in the clevis-holders I and J and the horizontal side K is provided with a slot L, which corresponds with the slot G in the horizontal side F. The horizontal side F is on its top part provided with teeth M which correspond with the teeth N on bottom part of the horizontal side K of plate B. Now it will be understood that by moving the two horizontal sides F and K sidewise they will engage a greater or less number of teeth together and thus give different distances between the two perpendicular sides C and H, so that I can match them according to the distance between the two sets of clevis-holders D E and I J. When the suitable distance is obtained, they are kept in this position by help of the two bolts O and P, which fit the slots G and L. The front-part Q of the horizontal side F is provided with holes $q, q', q^2$, so that it can substitute the clevis holders D E and I J. To the rear-part of the horizontal side F is attached a brace holder R to secure the brace R'.

The rear coupling is constructed similar to the front-coupling only the sides S and T are provided with the two slots U and V with teeth W arranged between these slots and the sides X and Y are provided with slots to match the slots in the washers Z and Z'. To S is attached a brace holder $c$ to secure the brace $s'$. The above described couplings could now be fastened between two walking plows, and the team attached to the plow clevis holder Q, and the teamster directs the plowing by one of the pairs of handles and the whole rig would work like one double plow. But it will be observed that by doing this, without any extra arrangement of the plow parts of the front plow the handles of this plow will be in the way and the front end of the beam of this plow will force the horses to pull too far from the middle part of the two combined plows. To avoid these troubles it is that the described couplings, by help of bolts and braces as shown on the drawings are fastened to a shorter beam $d$, which has to take the place of the original beam of the intended front walking plow.

If this last mentioned walking plow is provided with a wooden beam, then must the substitute beam $d$, also be a wooden one which can be made to fit the balance of the wooden plow parts.

If the front walking plow is provided with an iron or steel beam then must the substitute beam also be iron or steel and shaped as shown in Fig. 5 and provided with the necessary slots $e', e^2, e^3$ for putting it in the place of the original beam. And with the necessary holes $f. f'.$, &c., in the front part and the holes $g, g', g^2$, &c., in the rear part for fastening the respective front and rear couplings.

What I do claim as my invention, and desire to secure by Letters Patent, is—

1. The herein described coupling for securing two plow beams together consisting of front and rear right angled sectional parts adapted to be secured to the respective beams and to be adjusted upon each other to secure said plow-beams at varying distances apart, substantially as shown and described.

2. In combination with two plow beams the right angled sections or couplings A and B the former provided with a clevis extension Q, and the rear sectional coupling S. T. with horizontal extensions X. Y. and means for adjustment of said beams to and from each other substantially as shown and described.

3. The combination with two plow beams of the front sectional couplings secured to their respective beams and slotted and serrated for lateral adjustment and provided with the horizontal clevis, the rear slotted and serrated sectional coupling and the braces R' S' substantially as shown and described.

JOHN JOHNSON.

Witnesses:
HANS J. WINTHERLICH,
CHARLES A. LÜCKE.